United States Patent

Escherich et al.

[11] Patent Number: 5,606,148
[45] Date of Patent: Feb. 25, 1997

[54] CABLE JOINT

[75] Inventors: Thomas A. Escherich; Axel T. Esser, both of Munich, Germany; Bryan D. Neaves, Stratton St. Margaret, United Kingdom

[73] Assignee: Raychem GmbH, Ottobrunn, Germany

[21] Appl. No.: 481,452

[22] PCT Filed: Jan. 13, 1994

[86] PCT No.: PCT/GB94/00070

§ 371 Date: Jul. 11, 1995

§ 102(e) Date: Jul. 11, 1995

[87] PCT Pub. No.: WO94/16485

PCT Pub. Date: Jul. 21, 1994

[30] Foreign Application Priority Data

Jan. 15, 1993 [GB] United Kingdom ............... 9300728

[51] Int. Cl.⁶ ...................................... H01R 4/70
[52] U.S. Cl. ........................... 174/88 R; 174/84 R
[58] Field of Search ............... 174/84 R, 88 R, 174/76; 156/48, 49; 29/868, 869, 858

[56] References Cited

U.S. PATENT DOCUMENTS

| | | | |
|---|---|---|---|
| 3,935,893 | 2/1976 | Stang et al. | 152/347 |
| 4,591,622 | 5/1986 | Blizzard et al. | 525/477 |
| 4,654,473 | 3/1987 | Roux et al. | 174/84 R |
| 4,681,986 | 7/1987 | Settineri | 174/84 R |
| 5,232,702 | 8/1993 | Pfister et al. | 424/448 |

FOREIGN PATENT DOCUMENTS

| | | | |
|---|---|---|---|
| 0067009 | 12/1982 | European Pat. Off. | |
| 0115220 | 8/1984 | European Pat. Off. | |
| 0153174 | 8/1985 | European Pat. Off. | |
| 0174165A1 | 3/1986 | European Pat. Off. | H01B 1/20 |
| 0296868A2 | 12/1988 | European Pat. Off. | B29C 61/06 |
| 2624665 | 6/1989 | European Pat. Off. | |
| 2144592 | 3/1985 | United Kingdom | H02G 15/14 |
| WO91/00601 | 1/1991 | WIPO | H01B 7/28 |
| WO94/16485 | 7/1994 | WIPO | H02G 15/00 |

*Primary Examiner*—Kristine L. Kincaid
*Assistant Examiner*—Marc Machtinger
*Attorney, Agent, or Firm*—Herbert G. Burkard; Yuan Chao

[57] ABSTRACT

An electric cable joint is enclosed within a heat shrinkable sleeve. The joint region is sealed against the ingress of moisture by a material made of a non-crystalline polymer whose glass transition temperature is less than −40° C. Further, the material has a viscosity at 35° C. of less than $10^6$ Pa-sec and a viscosity at 95° C. of greater than $10^3$ Pa-sec (both viscosities measured at a shear rate of 0.02 $sec^{-1}$) and a minimum tack value of about 140 $gm/cm^2$.

13 Claims, 1 Drawing Sheet

CABLE JOINT

BACKGROUND OF THE INVENTION

1. Field of the Invention

This invention relates to a cable joint, for example a low voltage, 1 kV joint, and in particular to a cable joint, for example a branch joint, that is substantially sealed against the ingress of moisture, for example a joint having sealant material retained within a heat-recoverable sleeve or other housing that applies pressure to the sealing material during installation of the joint.

2. Description of the Prior Art

Joints in cables, whether power or communications cables, and whether in-line or branch joints, often need to be sealed against the ingress of moisture, either as a vapour or a liquid, which may be under pressure. Furthermore, for multicore power cables operating at voltages of 1 kV or higher, it is necessary to fill the joint so as to prevent any moisture that may have penetrated the cable from reaching the electrically-vulnerable joint region. Such moisture could have a deleterious effect on the joint and eventually lead to its electrical failure by breakdown from operating voltage to earth potential. These sealing problems are particularly acute in the case of a power cable, which undergoes thermal cycling and in continuous operation can reach a conductor temperature of 90° C., or even 130° C. under certain conditions. The pressure pumping effect of the thermal cycling, combined with the high temperature can allow any water that is in the cable to enter the joint and potentially fore a short circuit, and can also produce voids arising from breakage of interfacial sealing with the cable cores, and also from the sealant material being urged away from the conductors and even from the joint region and along the cable. Such problems are made even worse in the case of a branch joint, since the volume to be filled is comparatively large and has a complicated geometry, thus making it more difficult to ensure sufficient sealing.

Sealed joints can be of various types, for example: (1) a rigid box that is filled with a liquid composition that solidifies, such a composition may be poured in hot, for example bitumen, or may comprise a cold curing system, for example polyurethane resin; (2) a rigid box that is filled with a liquid composition that forms a flexible skin upon contact with air or moisture; (3) a taped housing into which is injected a liquid composition that solidifies: (4) a heat recoverable sleeve having internally coated thereon a mastic or hot melt sealant which becomes liquid upon heating the sleeve and flows to fill the joint; and (5) a two part housing that is filled with grease or a putty-like filler that is squeezed into voids within the joint region upon closing together of the two parts by mechanical means, the housing may be subsequently contained within a heat recoverable sleeve that seals on to the cable jackets. The types (2) and (5) have no, or only very limited, resistance to water pressure, and these and other types do not always reliably fill the joint region, especially at low ambient temperatures.

Various joint constructions have been proposed to achieve water blocking and void filling. WO 91/00601 (Raychem) discloses an electrical cable in-line or branch joint in which a first, hydrophobic sealant material is located around the exposed electrical connections of the cable conductors to act as a water seal, and in which a second, blocking material, such as fibrous material, is located in the crutch region of the joint to prevent the hydrophobic material being physically displaced away from the electrical connections by pressure of water within the cable, or by pressure within the material generated by load-cycling of the cable. The joint region is encapsulated within a heat-shrinkable polymeric sleeve that is selected to be resistant to higher temperatures so that sufficient heat can be applied to it to cause the sleeve to recover into sealing contact with the cable jackets, and to exert sufficient pressure on the sealant material and to transmit sufficient heat thereto such that the sealant melts and flows into all the interstices in, between, and around the conductors and the connector so as to fill any voids.

EP-A-0 153 174 (Raychem) discloses a medium voltage power cable joint in which an insert is disposed between connected conductors of two cables; At least the outer surface of the insert comprises a void filling material, and so overcomes the problem of getting the sealant into the relatively inaccessible region between the cores. Further portions of void-filling material are placed around the outside of the conductors, and the joint region is then enclosed within a heat recoverable polymeric sleeve. The preferred void-filling material is a thermoplastic material having a viscosity at 70° C. of between about $1\times10^3$ and about $1\times10^5$ poise. On application of heat to effect recovery of the sleeve, the void filling materials melt and the pressure of recovery of the sleeve forces the material to fill all the spaces between the insert, the conductors and the sleeve.

GB-A-2 100 281 (Raychem) discloses a hydrophobic filling composition based on mineral oil for sealing connections between telecommunication cables. The filler is contained within a polymeric wrapper and is manually urged into the interstices between the plurality of conductors. The splice region is finally enclosed within a heat-recoverable polymeric sleeve.

GB-A-1 177 915 (Lacal Industries) discloses a cable joint between two single-core cables in which a non-hygroscopic, non-melting, water-repellent grease is urged by the recovery of a heat-recoverable sleeve around and into the interstices of an exposed stranded conductor.

GB-A-2 099 639 (Tatsuta Electric Wire and Cable) discloses a gas-tight cable joint wherein a resin filler is retained within a heat shrinkable sleeve around the joint in which a sealing tape is wound around the cut back ends of the cables to enhance the pressure sealing.

EP-B-0 115 220 (Minnesota Mining and Manufacturing) discloses a pressure tight termination of a pressurised long distance cable in which a sealing composition, which may be a thixotropic polyurethane-based material, is applied to bared wires of the cable, and is cured by the heat from an externally-applied heat-shrinkable sleeve.

WO 87/07779 (Raychem) discloses a waterblocked telecommunications cable in which void-filling material, such as foam ethylene propylene diene rubber or gel, is inserted between and around groups of a plurality of insulated conductors. A tape is then wrapped around the void-filling material so as to prevent its migration along the greasy conductors, and the tape itself may then be contained within a cast material or a heat-recoverable sleeve.

SUMMARY OF THE INVENTION

It is one object of the present invention to provide a moisture-sealed, electrically-insulated cable joint in which a single material is effective both to seal and to block the joint in a convenient manner during the comparatively low temperature that exists at installation and to maintain the sealing and blocking during the comparatively high temperature that exists in operation.

Thus, in accordance with one aspect of the present invention, there is provided an electric cable joint in which electrical connection is made between respective cores of at least two, preferably multi-core, cables, and in which flow of moisture through the joint is substantially prevented by electrically insulating sealant material that is located between and/or around the cores, and in which the sealant material is urged between and around the cores by the recovery therearound of a heat-recoverable sleeve, characterised in that the sealant material (a) comprises a non-crystalline polymer whose glass transition temperature is less than about −40° C.

(b) has a viscosity, measured at a shear rate of 0.02 sec$^{-1}$ and at a temperature of about 45° C., that is less than about $10^6$ Pa-sec;

(c) has a viscosity, measured at a shear rate of 0.02 sec$^{-1}$ and at a temperature of about 95° C., that is greater than about $10^3$ Pa-sec, and (d) has a minimum tack value of about 140 gm/cm².

DESCRIPTION OF THE PREFERRED EMBODIMENT(S)

Figure 1:
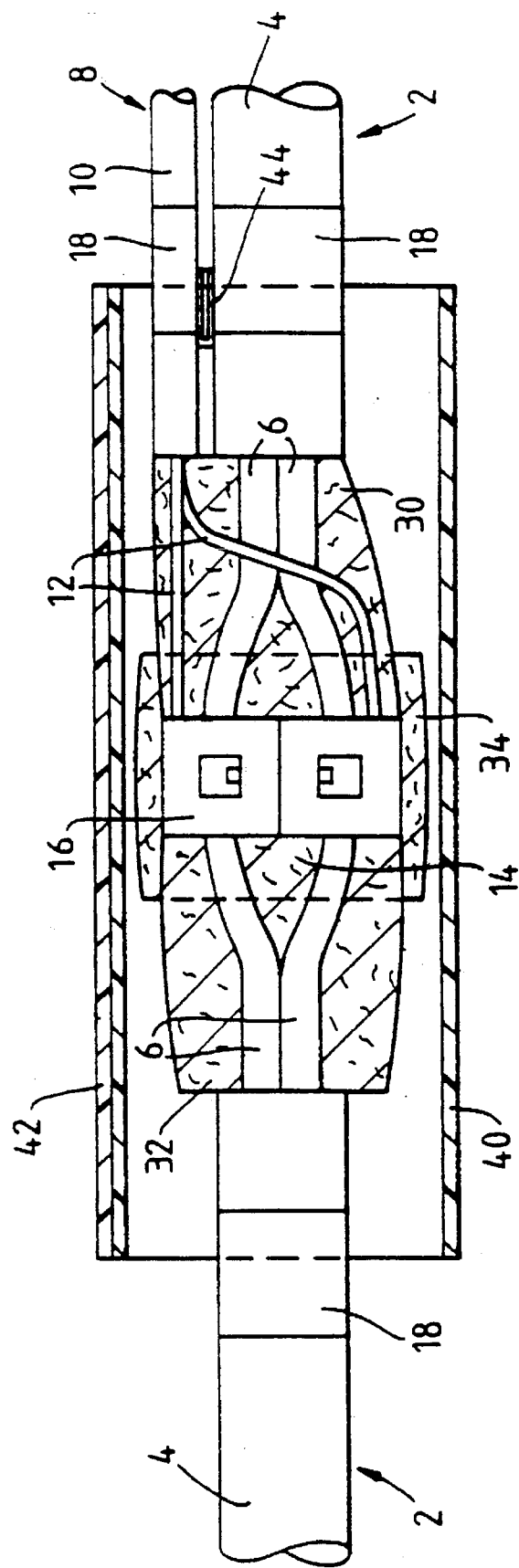
FIG. 1 shows in cross-section a cable joint of this invention.

The two cables may each be multi-core cables, or the joint may be formed between a single multi-core cable and a plurality of single-core cables. Typically the multi-core cable would have three, or four, cores.

The sealant material may advantageously comprise a first, generally form-stable elongate portion that is disposed between the cores of the jointed cables, and one or more further portions of sheet or tape configuration that are wrapped around the jointed cable cores.

The viscosity and tack of the sealant material are important characteristics, and are to be selected such that the material (i) will soften under the action of the heat applied to recover the outer sleeve such that the material conforms closely to the cables and cable connector under pressure of recovery of the sleeve, and seals the joint region against ingress of moisture, (ii) remains in position so as to maintain that sealing during operation, when the cable cores can reach about 95° C. continuous operating temperature and up to about 130° C. for short periods of time, and (iii) will remain substantially adhered to the cables and connector under expected operating conditions, and maintain a high level of tack during its lifetime to ensure good interfacial sealing in the joint. The sealant material used in she present invention does not cure around the cable joint, and its viscosity at all temperatures to which it is in practice exposed is such that it remains soft.

Preferably the viscosity of the sealant material at 45° C. is less than about $4.10^5$ Pa-sec, and advantageously is of the order of $1.10^5$ Pa-sec. Preferably the viscosity at 95° C. is greater than about $5.10^3$ Pa-sec, more preferably greater than about $1.10^4$ Pa-sec, and advantageously is about $2.10^4$ Pa-sec. (All viscosities are measured at a shear rate of 0.02 sec$^{-1}$).

It should also be noted that tests have shown that during installation of a joint in accordance with the invention, at the stage when recovery of the sleeve and the normal post-heating have been completed, the temperature immediately inside the sleeve can be as high as 95° C., 40° C. at the middle of the sealant, and 30° C. at the innermost portion of the sealant at the cable cores. About 20 to 30 minutes later, an equilibrium temperature of about 60° C. exists radially through the joint, subsequent to which the temperature falls back to an ambient level (until energisation of the cable). For some hours after heating and shrinking of the sleeve has been completed, the sealant is still relaxing and migrating throughout the joint due to internal pressure.

The tack of the sealant material, as measured in accordance with a modification of the test specified in DTU 39.4 Annexe III, is at least 140 gm-force/cm² and preferably lies within the range 220 to 250 gm-force/cm², at ambient temperature. The test modification consists of not compressing the sample by the specified 10%, but simply carrying out the test on an uncompressed sample having a thickness of 5 min.

The squash resistance of the material, as measured in accordance with Document Technique Unifié (DTU) No. 39.4, of March 1977, Annexe Ill, should preferably exceed about 250 g/cm² and usually be at least about 350 g/cm², and preferably is about 600 g/cm², and is less than 800 g/cm², at ambient temperature and after thixotropic behaviour has recovered. In order for the sealant material to be urged around the components of the joint, it will be understood that the recovery force of the outer sleeve must be sufficient so as to overcome the squash resistance of the sealant material.

The sealant material of the joint of the invention has been shown still to be migrating within the joint several hours afar completion of the installation, ie. after it has cooled down, and this is believed to be due to relaxation of pressure within the material, possibly due to the gradual release of stored energy in small gaseous entrapments within the material, which have been found to account for up to 5% or 6%, or even more, say 10% or more, of the total volume of the sealant material. It will be appreciated that operation of a joint at around 1 kV is not adversely affected by such small voids.

The insulating properties of the sealant material are such that it typically has a volume resistivity of the order of $1 \times 10^{12}$ ohm-cm at least, and advantageously in excess of $1 \times 10^{13}$ ohm-cm.

The sealant material may exhibit thixotropic behaviour, that is to say, it generally maintains its form at zero applied stress but will flow when subjected to a comparatively low applied force.

The sealant material preferably comprises (a) an inert filer, that is to say a material that has very little propensity to absorb water, (b) a combination of a solid rubber material and a liquid rubber material, the two kinds of rubber being compatible with each other and mixed in proportions so as to achieve the required viscosity for the total composition, (c) a material such as fumed silica in order to provide or enhance the thixotropy of the material, and (d) a tackifier, such as a phenolic resin. It will be appreciated that other components, such as antioxidants, processing aids (such as stearic acid) may also be included in the total composition.

Suitable sealant materials are a mastic having a relatively high amount of inert filler, of say between 60 and 75% by weight of the total weight of the material. Typically, the filler would be chalk (calcium carbonate), chlorite (for example one or more of magnesium-, aluminium-, and silicate-hydrate), quartz, mica, or slate. The liquid rubber material may be selected from polyisobutylene, ethylene propenediene monomer, and nitrile rubber. The solid rubber material may be selected from ethylene propylenediene monomer, nitrile rubber, styrenebutadiene rubber, butyl rubber, and silicone.

A preferred sealant material comprises a composition (by weight) of

| | |
|---|---|
| butyl rubber | 5% (approximately) |
| crystalline chalk | 70–75% |
| stearic acid | 0.5% (approximately) |
| polyisobutylene | 20% (approximately) |
| fumed silica | 1–2% |
| phenolic resin | 1–2% |
| antioxidant | 0.5–1% |

It will be appreciated that the exact amounts of the various components may be adjusted within the limited of trial and error to achieve the desired viscosity (or squash resistance) and/or tack requirements of the material, add in some instances, the inert filler may comprise down to about 60% of the total composition.

An advantage of the sealant material used in the present invention is that on exposure to heat on recovery of the heat-recoverable sleeve, it softens under the recovery pressure of the sleeve and is urged into interstices between and around the cables and the connector in the joint region, and yet on thermal cycling and at the 90° C. to 95° C. operating temperature, it does not significantly flow or migrate, even under the pressure of any water that might be in the cable. Such water pressure can be as much as 1 bar, and tends to urge the filling material of known joints with non-curing fillers away from the vulnerable joint region and into the cable itself, leading to failure of the joint.

It will be noted that the sealant material is not cross-linked, but depends on its viscosity and tack characteristics to function properly.

Advantageously, the sealant material is supplied in the form of a tape, or sheet, having a textile fleece on one surface and enclosed within release layers of foil or paper, for ease of storage and of handling during installation. It has been found that the textile fleece remains within the bulk of the sealant material after softening and does not adversely interfere with the filling and sealing of the joint.

According to a further aspect of the present invention there is provided a tacky sealant (or blocking or filler) material, for example the sealant material described above, in tape or sheet form, for a cable joint, and a joint comprising such a material, wherein a backing layer (or strip) of textile material is applied to at least one surface of the sealant material, thereby to assist in the handling of the tacky sealant material, whereby the textile material during installation and during operation of the joint has no adverse effect on its sealing (or blocking or filling), for example by becoming mixed into the sealant material during a heating and/or compression process.

Typically in a power cable branch joint of the present invention, the quantity of sealant material required is about 2 to 3 liters, and sufficient heat has to be applied thereto in order to ensure that the material even at the innermost regions of the joint has its temperature raised sufficiently. In order safely to apply sufficient heat and a sufficient recovery force to such a quantity of material by means of a heat recoverable sleeve, a composite sleeve is preferred, that is to say, a sleeve formed of a composite material, preferably a polymer reinforced by fibres, which may be in the form of a fabric. The fibres or fabric, and/or the polymer may be recoverable. The polymer may be polyethylene, and the fibres may be glass fibres. The sleeve may be applied as a tubular sleeve or as a wraparound sleeve having a closure mechanism, depending on the joint construction. Suitable recoverable sleeves are described in, for example, the following patent publications, the entire contents of which are herein incorporated by this reference: GB-B-2 135 632, GB-B-2 168 648, GB-B-2 139 142, GB-B-2 133 740, GB-B-2 134 334, and EP-A-0 324 630. Sleeves of this type are available from Raychem, being made of RAYFORT (tradename) material and sold under the tradenames XAGA 500 and XAGA 1000. Such sleeves have particularly good resistance to splitting, even under the relatively high temperature of a gas torch used to effect their recovery. Subsequently upon cooling, the sleeves have high hoop strength and creep resistance, and are mechanically tough.

It has thus been found that by using such a composite sleeve, and a sealant material selected to have the characteristics specified herein, a single composition of material can be used both to seal and to block a cable joint (or termination), thereby substantially preventing ingress of moisture into the electrically sensitive connection region, and maintaining the joint substantially sealed, during operation, including load cycling.

The cable joint may be an in-line joint or a branch joint, employing one or more branch cables.

The sealant composition of the joint of the invention may typically contain approximately 5 or 6% (or more), by volume, of gaseous entrapments, which may be air, introduced for example by a mixing process during manufacture. It is envisaged that elasticity of such entrapments (or voids) may provide, or contribute to, the filling action of the material throughout the joint, during installation and/or during operation (for example under the temperature and pressure variations produced during load cycling). It is thus in accordance with another aspect of the present invention to provide a sealant (or blocking or filling) material for a cable joint that contains such a quantity of gaseous entrapments that ensures or enhances complete sealing of the joint during installation, and that maintains such sealing during operation, under the action of temperature and/or pressure. Such applied temperature and/or pressure may arise during installation from the application of an enclosing heat-recoverable polymeric sleeve (of composite or non-composite construction).

An electric power cable joint, and its method of assembly, each in accordance with the present invention, will now be described, by way of example, with reference to the accompanying drawing, which shows a sectional elevation of a 1 kV branch joint between a main cable of conductor size 150 mm$^2$ and a branch cable of conductor size 50 mm$^2$.

FIG. 1 shows the components of the joint as arranged immediately prior to the application of heat to the outer recoverable sleeve.

The branch joint is formed between a four-core main cable 2 having an outer insulating jacket 4 and individually-insulated cores 6 (only two of which are shown), and a similarly-constructed four core branch cable 8 having an insulating jacket 10 and individually-insulated cores 12 (only two of which are shown). The main cable outer jacket 4, is cut back and removed at the region where the branch joint is to be made, but the cores 6 are not cut, and their individual insulation remains intact.

Where cable 2 contains a filler between cores 6, a strip or section of such filler is removed from between the exposed cores 6 in a central region and two elongate strips of a preferred sealant 14 are introduced between the cores 6 in such central region. The cores 6 are then pressed together to become partially embedded in the sealant 14. A conventional two-piece multi-core connector 16, such as available from Pfisterer or Arcus, is then assembled around the embedded cores and the insulation-piercing contact members, for example screws, thereof (not shown) tightened so as to make electrical contact with the respective core conductors.

The end of the branch cable 8 is cut back in a similar manner, its insulated cores 12 are end stripped and introduced into the connector 16 and electrical interconnections made thereby between the branch conductors and respective ones of those of the main cable.

Re-insulation of the joint region now has to be carried out. To this end, three sheets of the sealant material are provided, wrapped in a release paper, with a backing of textile fleece on one major surface. A first tape, or sheet, 30 of the preferred sealant material as described above has its release paper removed, and is wrapped, with the fabric side outwards, under slight tension around the main and branch cable cores 6, 12 to one side of and tightly up against the connector 16. The tape 30 is manually wrapped around the cores in conformity therewith. A second tape 32 of the same sealant material is similarly applied around the main cable cores 6 on the other side of the connector 16. Finally, a third tape 34 of the same sealant material is applied over the connector 16 and with equal length overlaps on to the tapes 30 and 32, and is manually wrapped in conformity with its underlying components.

A heat-shrinkable composite (polymer/fabric containing heat shrinkable fibres) wraparound sleeve 40 is positioned around the joint region with its closure 42 securing its longitudinal edges together in alignment with the branch cable 12. A three-fingered branch-off clip 44 is positioned over the sleeve 40 between the cables 2 and 12 so as to form respective conduits therearound, with the central, adhesive coated leg of the clip extending within the sleeve 40. Wrappings of alumimium foil 18 are positioned around the main cable 2 on each side of the sealant tapes 30, 32 and around the branch cable 8 beyond the sealant tape 30 so as to extend longitudinally beyond the sleeve 40 and to serve as heat protection for the jackets 4 and 10. Heat is then applied to the sleeve 40, starting in the central region of the joint and moving sequentially outwards to each end. As the sleeve 40 recovers radially, heat is conducted to the sealant tapes 30, 32, 34, and eventually to the strips 14, which soften. At the same time, the pressure from the shrinking sleeve acts on the sealant tapes so as to urge them into greater conformity with the cable cores 6, 12 and the connector 16, so as substantially to seal therearound. During this process air trapped within the sleeve and between the sealant and the cable components is urged out of the joint region. The limited change in viscosity of the filler material ensures that although it softens to achieve such conformity, it does not flow and thus it remains substantially within the sleeve 40 during its recovery. The sleeve 40 when fully recovered on to its substrate conforms and seals to the oversheaths 4, 10 of the main and branch cables 2, 12 respectively, and retains the sealant material by virtue of its adhesive lining. Post-heating of the sleeve 40 then takes place so as to apply further pressure on to the sealant material after its initial relaxation and migration. The temperature substantially equalises throughout the joint region whilst the sealant is still under pressure from the heated sleeve 40, thus enhancing the conformity and migration of the sealant to effect complete blocking and sealing of the joint. Subsequently during operation and thermal cycling of the cable, the limited viscosity change and the high tack of the sealant material ensures that it stays in place, maintaining interfacial sealing, and that it is not pushed away from the connector and cable cores and into the cables themselves under pressure of any water that might be present within the cables. Furthermore, the fact that the squash resistance of the sealant material exceeds any internal pressure generated inside the joint during operation also enhances retention of the sealant in the joint region.

Although in the described example three tapes of sealant material are applied around the cores, it is envisaged that one, or two, or even four or more tapes may be used if such a number were more appropriate to a joint of particular configuration or perhaps involving cable cores of different size.

We claim:

1. An electric cable joint in which electrical connection is made between respective cores of at least two cables, and in which flow of moisture through the joint is substantially prevented by an electrically insulating sealant material that is at least one of located between the cores and located around the cores, and in which the sealant material is urged between and around the cores by the recovery therearound of a heat recoverable sleeve, characterized in that the sealant material (a) comprises a non-crystalline polymer whose glass transition temperature is less than −40° C.;
    (b) has a viscosity, measured at a shear rate of 0.02 sec$^{-1}$ and at a temperature of 45° C., that is less than 4×10$^5$ Pa-sec; p1 (c) has a viscosity, measured at a shear rate of 0.02 sec$^{-1}$ and at a temperature of 95° C., that is less than 5×10$^3$ Pa-sec; and
    (d) has a minimum tack value of 140 gm/cm$^2$.

2. A cable joint according to claim 1, wherein the sealant material has a squash resistance of at least 250 g/cm$^2$ and less than 800 g/cm$^2$.

3. A cable joint according to claim 1, wherein the sealant material has a tack value within the range from 200 gm-force/cm$^2$ to 250 gm-force/cm$^2$.

4. A cable joint according to claim 1, wherein the sealant material exhibits thixotropic behavior.

5. A cable joint according to claim 1, wherein the sealant material comprises an inert filler, a solid rubber material and a liquid rubber material compatible therewith, fumed silica, and a tackifier.

6. A cable joint according to claim 1, wherein the sealant material contains between 60 and 75% by weight of the total weight of its composition in form of an inert filler.

7. A cable joint according to claim 6, wherein the inert filler is selected from the group consisting of chalk and mica.

8. A cable joint according to claim 1, containing a liquid rubber material selected from the group consisting of polyisobutylene, ethylene propylene diene monomer, and nitrile rubber.

9. A cable joint according to claim 1, containing a solid rubber material selected from the group consisting of ethylene propenediene monomer, nitrile rubber, styrenebutadiene rubber, butyl rubber, and silicone.

10. A cable joint according to claim 1, wherein the heat recoverable sleeve is a fiber-reinforced polymeric sleeve.

11. A cable joint according to claim 1, wherein the heat recoverable sleeve is a wraparound sleeve.

12. A cable joint according to claim 1, formed as a branch joint.

13. A cable joint according to claim 1, wherein the cables are multicore cables.

* * * * *

UNITED STATES PATENT AND TRADEMARK OFFICE
CERTIFICATE OF CORRECTION

PATENT NO. : 5,606,148
DATED : Feb. 25, 1997
INVENTOR(S) : Thomas A. Escherich, et al It is certified that error appears in the above-indentified patent and that said Letters Patent is hereby corrected as shown below:

Column 1, line 31, replace "fore" by--form--.

Column 3, line 51, replace "she" by--the--.

Column 4, line 15, replace "min." by--mm.--.

Column 4, line 27, replace "afar" by--after--.

Column 4, line 46, replace "filer" by--filler--.

Column 5, line 12, replace "limited" by--limits--.

Claim 1, line 14 (Column 8, line 27), delete "p1" and begin new indented paragraph with "(c)".

Claim 1, line 15, (Column 8, line 28), replace "less" by--greater--..

Signed and Sealed this

Fourth Day of November, 1997

BRUCE LEHMAN

*Attest:*

*Attesting Officer*       Commissioner of Patents and Trademarks